Dec. 7, 1943.                F. MILLIKEN                  2,336,027
                            LUBRICATED VALVE
                        Filed Feb. 14, 1942          2 Sheets-Sheet 1
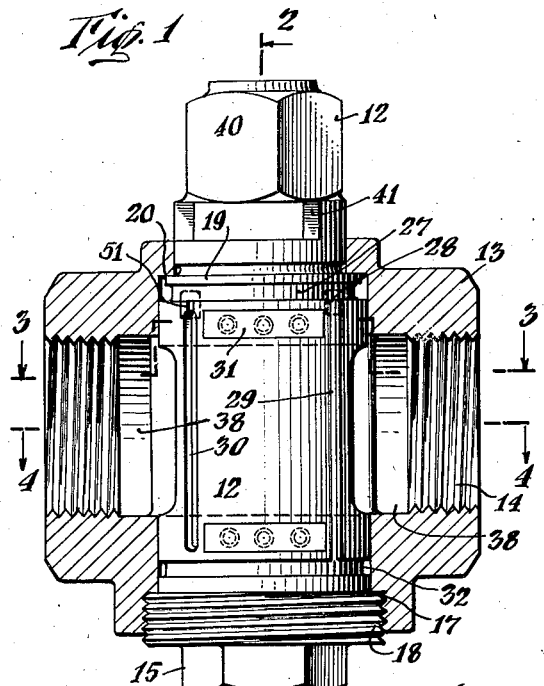
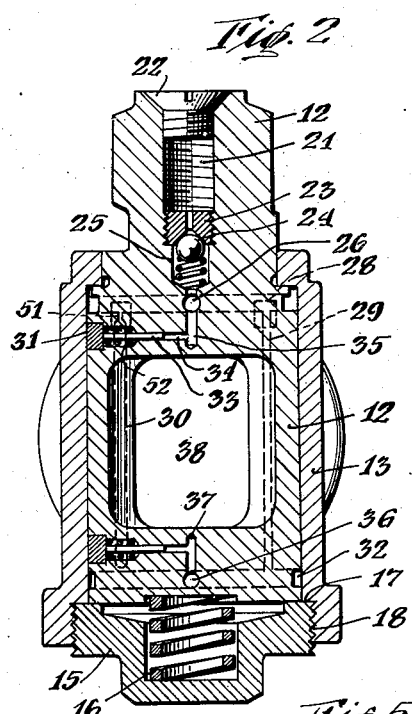
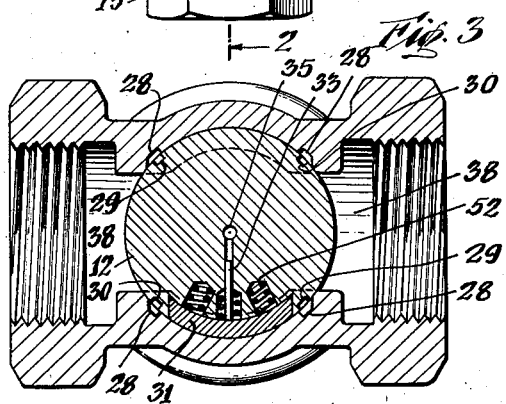
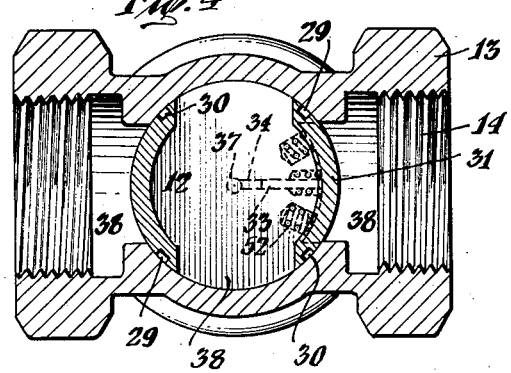
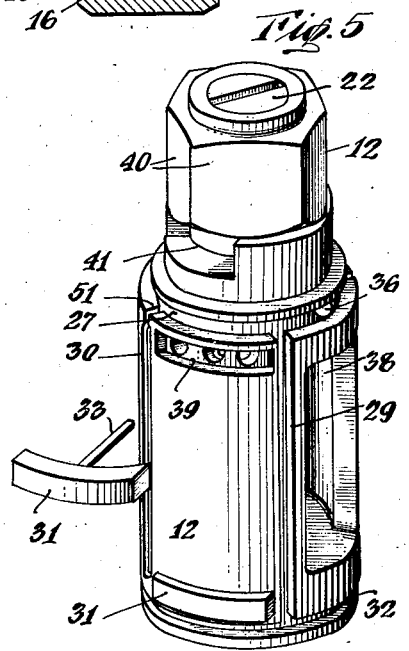
INVENTOR.
Foster Milliken
BY
Alan M. Mann
ATTORNEY

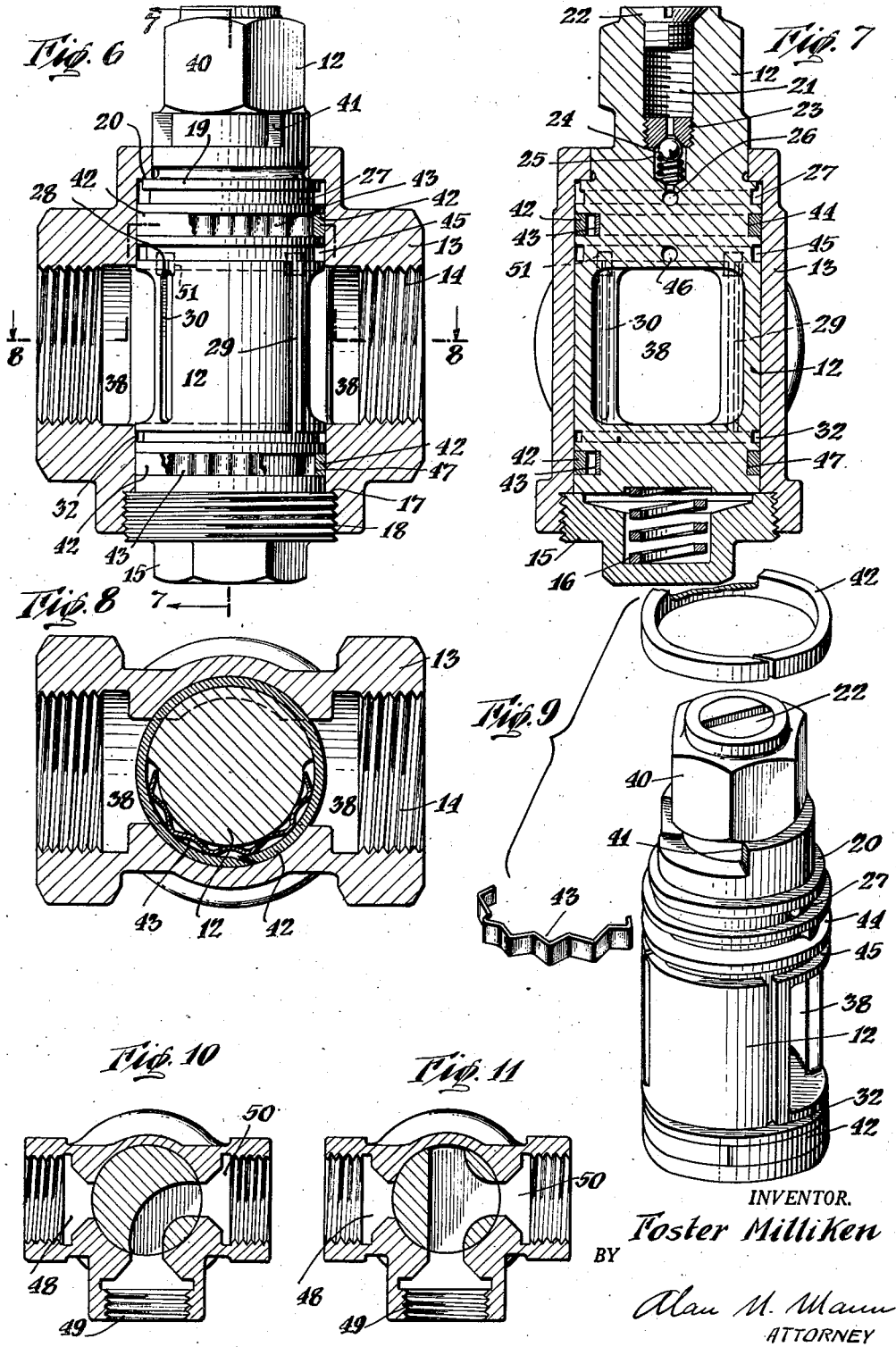

Patented Dec. 7, 1943

2,336,027

UNITED STATES PATENT OFFICE 2,336,027

LUBRICATED VALVE

Foster Milliken, Lawrence, N. Y., assignor to Milliken Valve Corporation, a corporation of New York Application February 14, 1942, Serial No. 430,864

4 Claims. (Cl. 251—93)

This invention relates to improved lubricated plug valves, and may be used either with ordinary through valves or with three-way or other multiple-port valves.

The invention is primarily intended for use with valves having a cylindrical plug in a cylindrical body bore and is so illustrated and described in the examples shown in the drawings. However, it may also be used with valves having a tapered plug. If the tapered plug is used, it ordinarily will be what is known as an inverted tapered plug, that is, the stem is on the end of the plug having the small diameter. As a result, the end of the plug having the small diameter ordinarily is placed at the top of the valve and the plug is inserted up through the bottom. In such case it is held in place by a bottom cover plate and spring just as is the case with the cylindrical valve.

This invention is used with valves of the type in which the plug has a horizontal shoulder near its upper end which bears against a corresponding shoulder in the body of the valve. This provides the sealing at the head of the valve, and the plug is so constructed as to have some (even though slight) horizontal movement within the valve bore. In such case, when the valve is in closed position, the line pressure acts on the closed face of the plug to force the plug over against the further wall of the body, and this pressure together with the lubricant film over the face of the plug tends to form a seal to avoid leaks. Accordingly, with this construction, the higher the line pressure the tighter this joint at the outlet port becomes.

With this type of valve it is also true that when the plug is forced over toward the outlet side, line pressure tends to be exerted underneath the plug to push it up toward the head. This increases the pressure between the sealing surfaces already referred to and tends to make a better seal at this joint to avoid head leaks.

To provide adequate sealing at the head, a lubricant channel is formed adjacent the line of contact between the horizontal surfaces already referred to. This pressure tends to push the valve down so that these surfaces are forced out of contact. Ordinarily the contact is maintained either by the line pressure referred to or by the action of a spring usually interposed underneath the plug. However, if the pressure on the lubricant is unduly increased, the horizontal joint between the plug and the body will open and excess lubricant will escape at the neck of the valve. This escape of lubricant indicates to the person operating the valve that the valve is over-lubricated and no further lubricant should be forced in, as it may contaminate the product passing through the line.

As is customary with valves of this type, some form of stop means is provided to cooperate between the stem and the body to limit rotation of the plug to the movement necessary to go from closed to open position and back. Thus the same side of the plug always is facing the inlet port of the body when the valve is closed.

The present invention includes with valves of this type additional improvements aimed to meet certain working conditions which may be enumerated as follows:

1st. On valves handling liquids or gases on a very low line pressure, there is sometimes not enough pressure exerted by the line on the closed face of the plug to make a positive seal against port leaks on the outlet port of the valve.

2nd. In handling certain very thin gases or very volatile liquids, it is very difficult to make a tight joint on the outlet port of the valve when the plug is in a closed position unless additional pressure is exerted to that given by the line pressure on the closed face of the plug.

3rd. On some forms of unlubricated valves, it is desirable to increase the pressure on the face of the closed plug above what is normally given by the line pressure.

4th. On vibrating lines, that is, lines in which the pipe is not thoroughly supported by pipe hangers, there are often vibrations which tend to jar or unseat the plug from its proper seat in the body. Again, in some lines in which the pressure is made by a pulsating pump with resultant varying pressures, there is a tendency to jar the plug away from its seat in the body. In both of these cases, it is advisable to have additional pressure over and above the line pressure to hold the plug in its right position to avoid port leaks.

I have discovered that the conditions such as those outlined above can be met by providing means so that the plug is not dependent entirely on line pressure to hold it against the body port of the valve on the outlet side when the plug is in closed position. Such means may be operated either by a mechanical force such as a spring or the lubricant pressure may be utilized to accomplish this result, or mechanical pressure and lubricating force may be combined.

In order to employ these forces, I preferably form recesses in the face of the plug, one above and one below the line of the port openings. These recesses should be positioned opposite that portion of the plug which will close the outlet port of the body when the valve is in closed position. Movable members are positioned in these recesses with an outer surface which approximately conforms to the contour of the plug. I may employ spring means to force these members outwardly to exert pressure between the plug and the body but I find that particularly valuable results can be obtained if the valve is so constructed that lubricant pressure can be built up behind these movable members. In this case the pressure to force the plug over to seal the outlet port can be adjusted by the operator and by so constructing the areas at the back of these movable members relative to the cross-sectional area of the ports which admit lubricant to them, I can utilize the principle of the hydraulic ram to build up very high pressures.

The recesses and the members which fit into them may be of a generally rectangular shape or they may be circular. When the recess in a cylinder is of a generally rectangular shape, a member which fits in it is termed a "glut." Where lubricant pressure is applied behind such a glut, there may be a tendency for excess lubricant to leak out unless a very fine fit is obtained. This difficulty can be overcome by supplying a flexible washer like the washer used in a pump to go behind such a movable member. Such washer may be made of leather or other appropriate material. Obviously such a washer can be made more conveniently when the recess and movable members are circular in cross section than where they are rectangular.

Where rectangular glut members are used, they ordinarily will be provided with stems to insure their even movement. Instead of providing a separate opening through which these stems run, they may fit loosely into the ducts through which the lubricant is admitted to the space back of the gluts. Where rectangular gluts are employed and it is desired to combine spring pressure and lubricant pressure, the springs will ordinarily be positioned at the sides of the lubricant opening. Where circular openings are employed, coil springs may be used which will fit closely to the walls of the opening.

Other mechanical structures may be employed to accomplish this result. Thus chases somewhat longer than those used with the gluts (say about 180° of the circumference) may be cut in the face of the plug and corrugated springs inserted to exert pressure between the plug and body. If desired, this type of spring may be combined with a split piston ring such as is ordinarily used with pistons of reciprocating engines. When such rings are employed, the appropriate chases to receive them must be provided.

Because of the relative ease of manufacture, I have referred to the spring mechanism as being fitted into the plug member. It is at least theoretically possible to have such movable members fitted into the body in such a way as to exert pressure against the plug. In any event, the essential features of my invention are that I must have a plug type valve in which the plug is so fitted that it can move diametrically between the inlet and outlet ports of the body, and means must be provided to exert pressure between the plug and the body to move the plug toward the outlet port of the body.

This pressure may be exerted by springs through members set into the face of the plug to continue the approximate contour of such face but better control can be had if lubricant pressure is used either alone or in conjunction with the springs.

This invention may be readily understood by reference to the accompanying drawings in which Fig. 1 represents a vertical section through the body of a valve embodying my invention showing the plug in open position; Fig. 2 is a vertical section through the body and the plug taken on line 2—2 of Fig. 1, still showing the plug in open position; Fig. 3 is a horizontal section of the valve taken on line 3—3 of Fig. 1, and Fig. 4 is a horizontal section taken on line 4—4 of Fig. 1 but showing the plug in closed position. Fig. 5 is a perspective view of the plug of Fig. 1 removed from the body and with one of the gluts removed; Fig. 6 is a view corresponding to Fig. 1 but showing an alternative form of construction; Fig. 7 is a sectional view on line 7—7 of Fig. 6; Fig. 8 is a transverse section taken on line 8—8 of Fig. 6; Fig. 9 is a perspective view of the plug of Fig. 6 removed from the body and with the spring and piston ring that form a part of this plug removed from the plug itself. Fig. 10 is a transverse sectional view of what is known as a 3-way valve with an L-port plug and Fig. 11 is a corresponding view of a 3-way valve with a T-port plug.

In these drawings, the numeral 12 designates the plug and 13 is the body of the valve. The body is provided with ordinary threaded pipe connections as indicated at 14. Obviously, other types of connections could be used such as flanged joints. 15 is a bottom cap which screws into the body and carries a spring 16 to hold the plug up in place in the body. The movement of the cap 16 is limited by the seat 17 when the threaded portions 18 are screwed in as far as they can go.

Near the top the plug has a portion 19 having a horizontal upper surface which presses against a shoulder 20 on the body to make a head seal for the valve. The plug 12 is provided with a chamber 21 to receive lubricant and this may be closed by a threaded cover 22. A valve comprising a seat 23, a ball 24 and spring 25 prevent the return of lubricant forced from the chamber 21 into the working parts of the device.

When pressure is exerted on lubricant in the chamber 21 it passes down through passages such as indicated at 26 into a circumferential recess which forms a duct 27 in the plug. From there, the lubricant may pass through short lubricant ducts 28 which are formed in the upper end of the body of the valve and which are commonly called dwarf grooves. When the valve is in fully open or fully closed position, these dwarf grooves connect the duct or recess 27 with the vertical lubricant ducts 29 and 30.

The two vertical lubricant ducts 29 run the full length of the plug and are arranged diametrically opposite each other and serve to connect the circumferential duct 27 with a lower circumferential lubricant duct 32. In addition, the two lubricant ducts 30 which are arranged diametrically opposite each other and spaced 90° away from the ducts 29 extend for a part of the length of the plug. They connect to the circumferential duct 27 by the restricted openings 51. When the plug is in either fully open or fully closed position, the dwarf grooves 28 connect with the grooves 30 but at the lower end the grooves 30 do not reach the lower horizontal lubricant duct 32. These vertical ducts 30 cross the port openings when the valve is moved from an open to a closed position or vice versa. The restricted openings 51 at the top are made so that the lubricant pressure will still be transmitted from the duct 27 to duct 30 at all times but owing to the restriction the volume of lubricant which passes is considerably reduced, so that no substantial amount of lubricant will be forced into the line when the ducts 30 are crossing the ports.

A pair of gluts 31 have each a curved face to conform to the curve of the plug and they fit into recess opening 39 (see Fig. 5). These gluts are arranged above and below the line of the port openings of the plug. One or more springs 52 are placed in proper receptacles in the plug back of the gluts in order to force the gluts outward and thus move the plugs over.

In cases where it is desirable to get a greater force than can conveniently be furnished by springs, it is possible to construct the gluts each with a stem 33 which fits loosely into the horizontal duct 34 and acts as a guide to keep glut 31 in its proper position. Such a construction can be used either with or without springs 52. When pressure is exerted in the lubricant chamber 31 this pressure is transmitted through the vertical duct 35 into the horizontal duct 34. Thence the lubricant will pass around the stem 33 and passing to the rear of the glut 31 will force this glut outwardly. In corresponding manner, ducts 36 and 37 can transmit the lubricant for the bottom glut 31. Due to the large area of the rear of the glut, the pressure on the lubricant will be multiplied in accordance with the well-known principle of the hydraulic ram.

On the top of the plug the stem is squared as indicated at 40 so that it can be rotated by an appropriate wrench through an arc of 90°. This limit of movement is controlled by a stop 41 acting against a corresponding stop on the body. The provision of these stops will insure the gluts 31 always being on the same side of the plug, and it is important that when the valve is connected in the line, this side must be the inlet side for the valve so that the springs 52 cooperate with the line pressure to keep the plug pressed to the outlet port.

In the modification shown in Figs. 6, 7, 8 and 9 the plug has chases 44 cut into it, one above and one below the port opening. In these chases are fitted springs 43 which may extend say 180° around the face of the plug. Outside of these springs and conforming to the outside diameter of the plug is a split piston ring such as is used on the pistons of all reciprocating engines. This ring is designated by the numeral 42. A corresponding chase 47 is cut at the lower portion of the plug to receive the second spring 43 and ring 42. In this case, two circumferential lubricant recesses or ducts are formed, one of them being designated by the numeral 45 and the other by the numeral 27, as it is directly similar to the duct already described in connection with Fig. 1. In the same way, an additional lubricant duct 32 is supplied near the bottom of the plug.

In 3-way valves and in other multiple-port valves it is desirable to have independent means in addition to the line pressure to force the plug over against the closed port, and this is particularly so when such valves are used in a negative position. In order to make this statement clear, I refer to Fig. 10 of the drawings which shows a cross-section of what is known as a three-way valve with an L-port plug. This construction enables the side port and the line port to be connected. All three ports can be closed. Fig. 11 is a cross-section of a three-way valve with a T-port plug. In this construction all three ports can be connected or two can be open and the third closed. The structures previously described can readily be used in connection with such valves.

In Figs. 10 and 11 when a line pressure at ports 50 and 49 (acting on the inside of the plug) exceeds the pressure at port 48 (acting on the outside of the plug) the valve is operated in what is known as a positive position. However, when the line pressure at 48 (acting on the outside of the plug) exceeds that at ports 49 and 50 (acting on the inside of the plug) the valve is operating in a negative position and in such case means such as has been described should be employed to hold the plug against the body of the valve as is the case when the position is a positive one. Without such means it is difficult to maintain these valves operating in a negative position against port leaks. Thus in the case of a 3-way valve, a special condition arises where the seal must be over the closed port.

It is understood that I do not intend to be limited to the particular examples shown, as it is my intention to cover all changes and modifications of the examples of the invention herein chosen for purposes of disclosure which do not constitute departures from the spirit and scope of the invention.

What I claim is:

1. In a valve of the type described having a body with inlet and outlet ports and a plug seat, a plug rotatable in said seat, said plug being fitted to move horizontally between the inlet and outlet ports of the body and having means for sealing the valve at the head to permit such movement; the provision of means to exert pressure between the plug and the body to move the plug toward the outlet port of the body when the valve is in closed position, said means comprising recesses in the face of the plug above and below the line of the port openings, said recesses being positioned opposite that portion of the plug which will close the outlet port of the body when the valve is in closed position, closely fitting movable members in said recesses having their inner and outer surfaces approximately concentric with the curvature of the plug, spring means to force these members outwardly to exert pressure between the plug and the body, and means whereby lubricant pressure may be built up behind these movable members.

2. In a valve of the type described having a body with inlet and outlet ports and a plug seat, a plug rotatable in said seat, said plug being fitted to move horizontally between the inlet and outlet ports of the body and having means for sealing the valve at the head to permit such movement, and having lubricant grooves between the body and plug largely surrounding the outlet port when the valve is in closed position; the provision of movable members set into recesses in the face of the plug and continuing the approximate contour of such face adapted to be moved outward of the plug to force the plug toward the outlet port of the body, and means whereby an increase in lubricant pressure will simultaneously increase the pressure on the lubricant in the channels around the outlet port and will increase the outward pressure on said movable members to tend to hold the plug against the body adjacent said outlet port and prevent the lubricant in said channels from forcing the plug substantially away from the body adjacent the outlet.

3. A structure as specified in claim 2 which further includes spring means for tensioning said movable members outwardly.

4. In a valve of the type described having a body with inlet and outlet ports, a plug seat, a plug rotatable in said seat, said plug being fitted to move horizontally between the inlet and outlet ports of the body and having means for sealing the valve at the head to permit such movement; the provision of movable members set into the face of the plug adapted to be moved outward of the plug to force the plug toward the outlet port of the body and lubricant means to exert pressure within the plug to force the movable members outwards and thereby to force the plug sideways in the body to hold the valve tightly closed.

FOSTER MILLIKEN.